United States Patent Office 3,557,046
Patented Jan. 19, 1971

3,557,046
STABLE SYSTEMS BASED ON POLYVINYL CHLO-
RIDE AND REACTIVE PLASTICIZERS
Irving E. Muskat, Miami, Fla., assignor to C-J
Corporation, a corporation of Delaware
No Drawing. Filed July 27, 1967, Ser. No. 656,349
Int. Cl. C08f 15/28
U.S. Cl. 260—41                    21 Claims

ABSTRACT OF THE DISCLOSURE

Blends of polyvinyl chloride and reactive polyunsaturated ester plasticizers such as glycol diacrylates and dimethacrylates including free radical generating polymerization catalyst are gelled at an intermediate temperature high enough to solvate the polyvinyl chloride but insufficient to cure the reactive plasticizer as by the use of temperatures in the range of 90–120° C. for short periods of time to form an at least partly solvated flexible substantially uncured solid material which is stable at room temperature and which can be subsequently shaped, flowed, and cured by the application of appropriate pressure at a temperature in the range of 120–200° C. Fiber reinforced gels are particularly contemplated. To facilitate handling and to provide blends with better fluidity and viscosity stability and which form nonbrittle products even without fiber reinforcement, mixtures of polyvinyl chloride having an average particle size of from 0.05 to 30 microns with larger polyvinyl chloride particles are used in weight proportions of from 60–80 parts of polyvinyl chloride per 40–20 parts of reactive plasticizer.

The present invention relates to the production of improved plastic products utilizing high molecular weight essentially homopolymeric polyvinyl chloride, including fiber reinforced products. The invention includes the provision of easily handleable fluid plastisols containing such essentially homopolymeric polyvinyl chloride in reactive liquid plasticizers which exhibit viscosity stability even in the presence of free radical catalysts so as to be useful in such easily handleable fluid form for extended periods of time and which can be cured to form tough, coherent products possessing thermoset-like properties such as greatly increased heat resistance. The invention is importantly based on the pretreatment of the polyvinyl chloride plastisol in order to obtain stable, flexible solid gelled products which, though essentially tack-free, can be shaped, caused to flow and cured when desired to provide tough cured products which can possess still further improved physical toughness as the result of fillers or fibers incorporated in the gel as well as more complete solvation of the polyvinyl chloride. Because it can flow during the cure, defects such as breaks, voids, air bubbles and the like are avoided during the application of heat and pressure.

High molecular weight essentially homopolymeric polyvinyl chloride is a known material. However, in addition to being tough and intractable which hampers effective application, it is also thermoplastic, being softened or degraded by elevated temperatures or many organic solvents. The invention is concerned with improving the molding and fabricating properties of the resin while providing thermoset characteristics, e.g., increasing the heat resistance and solvent resistance of the cured product. This may be contrasted with conventional plastisol application or other conventional expedients for handling polyvinyl chloride in which the above referred to properties of the resin are significantly degraded.

In an attempt to provide thermosetting characteristics polyvinyl chloride in the form of a dispersion grade resin having a particle size less than 30 microns can be blended with reactive plasticizers to form plastisols which cure at plastisols containing sufficient polyvinyl chloride to provide cured products of good property are difficult to handle. In some instances, the initial viscosity of the plastisol is excessive, making it difficult to obtain or use the initial dispersion. In other instances, viscosity stability is poor and it is economically disadvantageous to work with plastisols which must be consumed shortly after they are prepared. Some degree of increased handling time can be made available by increasing the proportion of liquid plasticizer in the mixture of plasticizer and finely divided polyvinyl chloride, but one begins to encounter brittleness in the final cured product and added expense since the reactive plasticizer is more costly than is the polyvinyl chloride resin which is modified thereby. Moreover, incorporation of fillers or fibers is limited by the need for adequate flow when the mixture is molded.

In general, and whenever the plastisol thickens to the point where it is no longer an easily pourable fluid, it is normally considered to lack utility, particularly for impregnating purposes. In this regard, it is noted that certain dry mixtures have been found to be useful, this being the subject of my prior copending application Ser. No. 573,858, filed Aug. 22, 1966, now abandoned.

In accordance with the invention, a liquid mixture of polyvinyl chloride particles and reactive plasticizer is heated at a temperature of about 90° to about 120° C. for short periods of time, typically 30 seconds to 1 minute to cause the mixture to gel and form an essentially non-tacky and flexible solid, it being discovered that such solid gel is stable and can be subsequently formed and cured at temperatures of from 120–200° C. The main idea is to solvate the polyvinyl chloride, at least in part, without significant polymerization or cross-linking of the reactive plasticizer. This is of especial importance in the provision of fiber reinforced products since the fiber reinforcement can be impregnated, gelled and stored to be finally shaped, flowed and cured when desired. In this way, even unstable fluid mixtures can be used since they can be consumed as prepared and larger proportions of liquid reactive plasticizer can be used since the fiber reinforcement overcomes the brittle tendencies of the cured product. Nonfibrous reinforcing materials are also useful and the gelled product can be used in sheet form or comminuted prior to molding. Comminution of fiber reinforced sheets is of especial significance when the comminuted pieces have a major dimension in the range of from ⅛″ to 1″ since the use of pieces facilitates distribution and the fibrous nature of the reinforcement is retained to permit high strength and high filler to binder ratio.

As will be understood, the dispersion of polyvinyl chloride particles in liquid plasticizers is usually termed a "plastisol" and this term will be used herein as a convenient identification for the dispersions which are used.

It is to be noted that the time and temperatures for gelation are based upon the temperature of the mixture which is being gelled and not to the temperature of the oven or mold in which gelation is to take place. Thus, and assuming an oven having a temperature of 115° C., it takes time for the mixture to reach reaction temperature and longer exposure periods of 10 to 20 minutes can be needed for the desired gelation. In preferred practice, and to minimize cross-linking during the gelation step, it is normally preferred to minimize exposure time and this can be achieved by increasing the rate of heat transmission to the mixture being gelled and by rapidly cooling the mixture after gelation has been accomplished.

Moreover, the mixtures which are gelled preferably include a free radical generating catalyst, it being kept in mind that the temperature to which the mixtures are heated as well as the time of exposure to such temperature should be insufficient to activate the catalyst which is selected. An important finding in accordance with the present invention is the fact that the catalyst retains its activity in the gel which is formed by solvation of the polyvinyl chloride particles. Indeed, catalytic activity is retained for many months so that, and when the gelled structure is later subjected to heat with appropriate pressure, the catalyst which is present in the gel remains active to promote polymerization of the reactive plasticizer.

As previously indicated, the new thermosetting materials of the invention are preferably based on particles of high molecular weight essentially homopolymeric polyvinyl chloride. These are of high molecular weight, as indicated by an intrinsic viscosity in excess of 1.4 measured in a 1% solution in cyclohexanone at 20° C. Such materials containing in excess of 96% by weight of polymerized vinyl chloride are particularly preferred, though up to about 10% of other materials may be present. In the limiting case, the polyvinyl chloride copolymer must retain its essential insolubility in the reactive plasticizer at room temperature for a reasonable period of time. Polyvinyl chloride made by any process can be reduced to a desirable particle size and used in this invention. It is again stressed that the useful polymers are essentially insoluble at room temperature in the reactive plasticizer prior to the gelation step and this is important. The proportions must also be appropriate to prevent conversion to a crumbly mass.

The polyvinyl chloride particles are combined with a reactive liquid plasticizer which, in the invention, is selected to be a low molecular weight ester reaction product of alpha,beta-unsaturated monocarboxylic acid such as acrylic acid, chloroacrylic acid, bromoacrylic acid, alkoxy acrylic acid (methoxy or butoxy), alkyl, aryl or acyl acrylic acid (methacrylic acid, phenylacrylic acid and crotonic acid) with an aliphatic polyhydric alcohol such as ethylene glycol, propylene glycol, n-butylene glycol, isobutylene glycol, 1,3-butylene glycol, 1,5-pentane diol, diethylene glycol, dipropylene glycol, trimethylol propane, glycerin, pentaerythritol, etc., the polyhydric alcohol having a molecular weight below 600, preferably below about 200, to provide a low molecular weight polyester having a plurality of highly reactive ethylenic groups per molecule and which, while incapable of dissolving the polyvinyl chloride at temperatures of about room temperature is, nonetheless, capable of solvating the polyvinyl chloride polymer at elevated temperatures. Still further, the reactivity of the plurality of unsaturated groups which are alpha,beta- to the ester groups is such that polymerization of the polyester can be achieved within the ambit of the same practical operating conditions within which the full solvation of the polyvinyl chloride is effected, e.g., the application of temperatures in the range of from 120-200° C. for a period of time of from 1-30 minutes. In actual operation, the bulk of the solvation normally precedes substantial completion of polymerization.

Typical reactive plasticizers in accordance with the invention are exemplified by ethylene glycol dimethacrylate, propylene glycol dimethacrylate, diethylene glycol dimethacrylate, 1,3-butylene glycol dimethacrylate 1,5-pentane diol dimethacrylate and trimethylol propane trimethacrylate. Similarly the acrylate and chloroacrylate and other alpha-substituted acrylic acid esters may be used.

The reactive plasticizer is preferably a fluid liquid at room temperature so that the plastisol can be easily handled. 1,3-butylene glycol dimethacrylate is especially preferred and will be used to illustrate the invention. If the reactive plasticizer is solid or excessively viscous at room temperature, it can be handled at a moderately elevated temperature.

Proportions are of particular importance to the present invention since, when the plastisol contains more than 75-80% by weight of polyvinyl chloride particles, the initial viscosity is unfavorable and the plastisol cannot be adequately handled. On the other hand, and from the standpoint of the properties which can be derived from the cured product, not more than about 35% by weight of the plastisol can be constituted by reactive plasticizer for, otherwise, the cured products tend to be brittle. It is to be noted, however, that the presence of fiber reinforcement strengthens the cured polyvinyl chloride plastisol so that products containing more than 35% by weight of reactive plasticizer and which are brittle in the absence of fiber reinforcement can be utilized. Up to about 40% of reactive plasticizer is entirely practicable with appropriate reinforcement and even larger proportions, up to about 55% or more can be used to gain maximum thermoset properties. As will be appreciated, the wet impregnated cloth or mat cannot be left to remain in this condition and the invention employs a moderate temperature pretreatment to solvate and solidify the plastisol component of the impregnated cloth or mat to provide a flexible solid fiber reinforced product which is stable for a prolonged period of time until needed, despite its capacity for flow and cure when subjected to curing temperatures and appropriate pressure.

While minor amounts of other reactive and nonreactive liquids may be present in the plastisol, these are preferably minimized or excluded to avoid problems of stability and compatibility in both the plastisol and in the cured product. Thus, under normal conditions and for most applications, the plastisol consists essentially of the polyvinyl chloride polymer, and the polyunsaturated ester plasticizer, and free radical polymerization catalyst so that the reactive plasticizer can polymerize within the time range that the polyvinyl chloride resin is fully solvated thereby.

The catalysts which are used in the invention are free radical polymerization catalysts, usually of the peroxy type. Numerous catalysts of this type are well-known, specific catalyst selection in accordance with the invention being of secondary significance despite the finding that these retain activity for long periods in the solid flexible mass which is formed. Catalyst selection is primarily determined by the temperature at which the catalyst liberates free radicals in sufficient quantity in a reasonable time. Thus, any catalyst known to be useful for curing the plasticizer per se can be used to cure the combinations which are formulated in accordance with the invention assuming that effective solvation can occur at the temperature of cure. Generally, the preferred catalysts liberate free radicals over the temperature range used for solvation and molding, usually in the range of from 120-200° C. On this basis, t-butyl perbenzoate is preferred to benzoyl peroxide when higher temperature cure is desired for the blends of polyvinyl chloride used herein. Azodiisobutyronitrile and like catalysts are also quite useful.

The plastisols of the invention may be further modified by the inclusion in the blend of fillers, pigments, dyes, lubricants, stabilizers and similar conventional additives, all as generally used in the industry. It will be appreciated that large proportions of filler increases the viscosity of the plastisol and reduces the capacity of the mixture to flow. In the invention, the capacity to gel the mixture to a flexible solid and then distribute comminuted pieces thereof to fill the mold cavity is helpful to enable the use of larger amounts of filler, and especially fibrous filler, than is consistent with the direct molding of the filled plastisol.

While the present invention does not require viscosity stable plastisols, it is convenient to have these available. It is a feature of the invention to employ plastisols which are highly fluid, viscosity stable and which cure at elevated temperatures to produce coherent, unitary and non-brittle thermoset products. As will later more fully appear, the conventionally sized dispersion grade polyvinyl chloride resins when dispersed in the reactive plasticizers used herein encounter many problems such as inadequate fluidity, viscosity instability, tendency to produce cured products which are brittle, and lack of capacity to reconstitute the dispersion by stirring. Moreover, when the proportion of reactive plasticizer is increased to ease the fluidity and viscosity stability problems, the cured products become more undesirably brittle. These problems are accommodated in the invention by the blending of polyvinyl particles of different average sizes in combination with the utilization of the selected reactive plasticizers in a narrow range of proportions.

It has been found that polyvinyl chloride particles having a particle size in the range of 0.05 to about 30 microns although inadequate when dispersed alone in the reactive plasticizers of the invention are improved from the standpoints of initial fluidity, viscosity stability and difficulty of reconstitution when thickening occurs at the bottom, by adding to the dispersion polyvinyl chloride particles of larger size having an average particle size of up to about 200 microns an average particle size of 70 microns being typical. These larger particles above form sandy mixtures which settle badly and mold poorly. When the differently sized polyvinyl chloride particles are used in combination in a weight ratio of large to small particle size polyvinyl chloride of from 1:3 to 2:1, preferably from 2:3 to 3:2, and when the reactive plasticizers are selected as noted hereinbefore, then it becomes possible to provide plastisols which contain from 60 to 80% by weight of polyvinyl chloride which are highly fluid and reasonably viscosity stable, and thickening at the bottom can be overcome by simple stirring. Moreover, these improved plastisols which include the differently sized polyvinyl chloride particles will cure at a temperature in the range of from 120–200° C. to form coherent, unitary, and nonbrittle thermoset products of high heat distortion temperature.

The provision of viscosity stable polyvinyl chloride plastisols capable of being thermoset to a non-brittle coherent solid is no simple matter as will be evident from the comparative data presented below carried out at 23° C. with 100 gram samples. All parts are by weight:

| Run: | Parts, 1,3-butylene glycol dimethacrylate | Parts, polyvinyl chloride homopolymer, particle size 0.05-30 microns | particle size 70 microns | Time dispersion retains handleable viscosity |
|---|---|---|---|---|
| 1 | 25 | 75 | | 0. |
| 2 | 30 | 70 | | 30 minutes. |
| 3 | 25 | 37.5 | 37.5 | 2-4 days. |
| 4 | 30 | 35 | 35 | 1 week. |

The mixture tabulated above was prepared by intimately mixing together the identified ingredients in the weight proportions noted with 1% by weight of t-butyl perbenzoate based on the dimethacrylate component. On the other hand, the larger the proportion of reactive plasticizer, the greater is the viscosity stability as is evident from the following: (data again obtained at 23° C. with 100 gram samples).

| Run: | Parts, 1,3-butylene glycol dimethacrylate | Parts, polyvinyl chloride homopolymer, particle size 0.05-30 microns | particle size 70 microns | Time dispersion retains handleable viscosity |
|---|---|---|---|---|
| 5 | 35 | | 65 | 2 days. |
| 6 | 40 | | 60 | 1 week. |

However, merely increasing the proportion of reactive plasticizer as in Runs 5 and 6 is hardly a satisfactory answer to the problem. Aside from the fact that the reactive plasticizer is more expensive than the polyvinyl chloride dispersed therein, the finely divided dispersion grade polyvinyl chloride thickens at the bottom on standing and dispersion cannot be restored by simple stirring. When the large particle size polyvinyl chloride is included in the mixture, these have a smaller ratio of surface to mass and do not swell as rapidly so that if settling occurs, the large only slightly swollen particles prevent agglomeration and simple stirring restores the dispersion. Curiously, if the larger particles of polyvinyl chloride are used without the dispersion grade particles, a sandy mixture is formed which settles badly, and if this sandy mixture is molded under pressure the liquid component is squeezed away from the solid. Also, and as the proportion of reactive plasticizer increases beyond 35% of the mixture, the cured molded product produced from the mixture tends to be brittle and to include many cracks. At a 40/60 mixture of reactive plasticizer and polyvinyl chloride of dispersion grade particle size, cracking of molded products becomes a problem.

On the other hand, and using the mixtures of the invention, molded products which are nonbrittle are easily obtained even when the proportion of reactive plasticizer is as high as 40% of the dispersion.

In contrast, and using minimum proportions of reactive plasticizer, the use of only 20% of reactive plasticizer in the dispersion does not produce a handleable viscosity. By using the blends of the invention, the mixture becomes handleable even though it is still quite viscous.

In producing molded products from the liquid mixture of the invention, the plastisol may be first deaerated under vacuum (1 mm. of mercury applied for 15 minutes). Molding was carried out in a stainless steel mold constructed from 1/16 inch thick plate to define a 4" x 4" x 1/16" mold cavity. The loading on the plates was 10,000 pounds which is applied for various times and temperatures. In addition to identifying the appearance of the molding, it is important to note the heat distortion temperature which is obtained. For this purpose, a specimen 2 cm. x 9 cm. is cut from the molded product and one end thereof is clamped in a holder to provide 1 cm. of length within the holder and 8 cm. of length extending out of the holder. This assembly of test piece and holder is placed in an oven equipped with an internal circulating fan and heated at a rate of 2° C. per minute with the test piece being horizontal. Heating is continued until the free end of the piece deflects 1.0 cm. as a result of its own weight and the temperature at which this deflection occurs is identified as the heat distortion temperature of the sample.

The products of the invention can be cured at various temperatures and for various lengths of time. The table which follows illustrates the results obtained with a mixture of 30 parts of 1,3-butylene glycol dimethacrylate, 35 parts fine particle size polyvinyl chloride, 35 parts polyvinyl chloride having an average particle size of 70 microns and 0.1% of azobisisobutyronitrile catalyst.

| Cure time and temperature, ° C. | Appearance of molding | Heat distortion temperature, ° C. |
|---|---|---|
| Three minutes at 125 | Hard, clear, tough, granular solid with many small opaque granules. Very light grey in color. | 150 |
| Three minutes at 135 | do | 155 |
| Three minutes at 150 | Hard, clear, tough, granular solid with many small opaque granules. Light tan in color. | 142 |
| Three minutes at 175 | Hard, clear, tough, granular solid with many small opaque granules. Orange-tan in color. | 144 |

At a lower concentraction of catalyst 0.05% azobisisobutylnonitrile (the same mixture reformed to above) cured as indicated below:

| Cure time and temperature, ° C. | Appearance of molding | Heat distortion temperature, ° C. |
|---|---|---|
| Five minutes at 125 | Hard, clear, tough, granular solid with many small opaque granules. Very light tan in color. | 133 |
| Three minutes at 135 | do | 144 |
| Three minutes at 150 | Hard, clear, tough, granular solid with many small opaque granules. Light tan in color. | 134 |

It is to be observed that the color of the molded piece is a variable, the lighter colors being distinctly preferred and the factor of discoloration may be handled utilizing stabilizers, but this aspect of the invention is common in the art and not an essential of the present development.

Referring now to the pretreatment of polyvinyl chloride plastisols in order to obtain stable solid gelled products which can be stored at room temperature and later shaped, flowed and cured at temperatures in the range of 120–200° C., any liquid mixture of polyvinyl chloride particles and reactive plasticizer of the type referred to herein may be utilized even though the plastisol contains more than 35% by weight of reactive plasticizer. This is because the fiber reinforcement which can be associated with the plastisol strengthens and toughens the cured product to avoid the tendency of excessive reactive plasticizer to produce a brittle product. Thus, weight ratios of polyvinyl chloride particles to reactive plasticizer of from about 80/20 to 50/50 are preferably contemplated. Similarly, the plastisol which is employed need not be viscosity stable since once it is applied, the intermediate temperature solidification technique enables the production of an intermediate which can be stored at room temperature until it is desired to use the same, thus overcoming the primary disadvantage of an unstable plastisol.

Gelation in the invention is achieved by heating at a temperature of about 90–120° C. At these temperatures, the reactive plasticizer combines with the polyvinyl chloride particles to at least partially solvate the same and provide a flexible solid gel matrix. The gel forms at these temperatures in about 30 seconds to one minute, but the temperature can be maintained at these intermediate levels for longer periods of time before significant cure begins to occur. In any event, and prior to the occurrence of significant curing, the gelled product is promptly cooled to room temperature where it is stable so that it may be stored at room temperature or at lower temperatures for long periods of time despite the fact that a capacity for further shaping, flow and curing is preserved.

It is desired to point out that the gelled product is useful whether it is fiber reinforced or not, but fiber reinforcement is preferred for some applications. Even in the absence of fiber reinforcement, it will be understood that particulate fillers such as clay, sand, wood flour, and the like, may be present to provide advantageous strengthening either for its own sake or to reduce any tendency for brittleness.

This phase of the invention is of particular advantage when the reinforcement is fibrous and especially when a fibrous layer is involved which may be in the form of a mat, cloth, or nonwoven fabric which is characterized by having all the filaments therein parallel to one another as may be achieved by winding a yarn or continuous filament on a drum with the liquid blend described above applied either to the drum as the filaments or yarns are wound thereon or to the filaments or yarns as they are led to the windup drum. In any event, and as will be readily understood, it is preferred to employ fibers and yarns made of glass and non-woven structures are particularly preferred because these permit the fibers and yarns to move as the resin flows with the application of heat and pressure.

The ratio of resin to fiber may vary considerably, the invention permitting high ratios of reinforcing fiber to binder. When the fiber reinforcement is in the form of a nonwoven mat, a typical ratio of glass fiber is from 10–20%, based on the weight of the impregnated mat. Higher ratios can be employed with woven cloth made of glass fiber, e.g., 20–40% by weight of fiber based on the weight of the impregnated cloth. Still higher ratios are appropriate to filament or yarn which are wound on a drum, e.g., 40% by weight or higher. For many applications when fiber reinforcing is used in mat form, it is desirable to avoid the use of binders for the mat which may restrict the independent flow of the fibers during molding operations.

The fibrous layer which is impregnated and then gelled in accordance with the invention may be used in sheet form, in which case one or several sheets may be utilized in a final molding operation with the application of temperatures in the range of 120–200° C. and appropriate pressure depending upon the temperature and the extent of flow required to reshape the sheet into the form desired. It has been found that both the resin and the fiber are free to flow under applied heat and pressure, but the flow of the fiber reinforcement is limited by the nature of the reinforcing material. Nonetheless, and as a minimum, extensive curvature may be imparted to flat sheets, cracks are heated, voids eliminated and individual pieces of sheet material flow together to provide a unitary product during the cure.

In accordance with a feature of the invention, the solid gel with its fiber reinforcement is comminuted into pieces having a major dimension of from ⅛″ to 1″, preferably from ¼″ to ½″. These pieces are reinforced and the reinforcement retains a substantial fiber length. These pieces can be used to fill a mold and the various pieces flow together during the molding operation to form a unitary and cohesive molded piece. Of particular interest are nonwoven mats which are cut into pieces which may have a major dimension varying from 1/8" to about 2". The nonwoven nature of the mat permits extensive flow of the fiber with the resin under conditions of molding heat and pressure, and the cure is sufficiently extensive and satisfactory as to substantially completely eliminate the appearance of individual pieces in the final unitary product.

This mixture was of very low viscosity at 23° C. The solid gel formed as described in Example I was similar to that described in Example I, but softer and more flexible.

A thermoset product prepared under the cure conditions described in Example I had the same appearance, but exhibited a higher heat distortion temperature.

The following table describes the properties of the mixture of Example II filled with 20% by weight of various fillers. In each instance, a solvated, solid gel was prepared as described in Example I. The thermoset product was prepared from the gel by heating 3 minutes at 150° C. at 50 p.s.i.

TABLE I

| 80% mixture of Ex. II plus 20% filler | Viscosity of liquid mixture at 23° C. | Gel 1.6 mm. thick by heating 1 min. at 115° C. | Thermostat product prepared from gel by heating 3 min. at 150° C. at 50 p.s.i. |
| --- | --- | --- | --- |
| TiO$_2$ powder | Viscous paste | Very white, opaque, very flexible solid of moderate strength. | White, opaque, hard, tough, rigid solid. |
| CaCO$_3$ powder | Moderately viscous liquid | Translucent, very flexible solid of moderate strength. | Light tan, transluscent, hard, tough, rigid solid. |
| Al$_2$O$_3$ powder | Very low viscosity | Gray, opaque, very flexible solid of moderate strength. | Do. |
| Al powder | Low viscosity liquid | do | Gray, opaque, hard, tough, rigid solid. |

It should also be observed that the invention is of especial value in the production of molded pieces since one can not only fill the mold cavity with fiber reinforced gelled pieces just as though these were particles of molding powder, but the product is thermoset and not only possesses improved resistance to heat and solvent attack, but the hot molded piece in the mold cavity has greatly improved dimensional stability and it can be ejected from the mold cavity without extensive cooling as is required when ordinarily plasticized polyvinyl chloride is employed. At the same time, the need to lay up the fiber reinforcement is eliminated and this together with rapid ejection of product vastly improves the productivity of the molding equipment used.

EXAMPLE I

A mixture was prepared containing the following parts by weight:

1,3-butylene glycol dimethacrylate _____ 30
t-Butyl perbenzoate _____ 0.30
Polyvinyl chloride homopolymer (average particle size 70 microns) _____ 35
Polyvinyl chloride homopolymer (particle size in the range of 0.05–30 microns) _____ 35

This mixture was of low viscosity at 23° C. and easily pourable. It was deaerated under vacuum (1 mm.) and a solid gel was prepared using a laboratory press and a mold 4" x 4" x 1.6 mm. thick at contact pressure. The mold was heated for 1 minute at 115° C., followed by rapid cooling to 23° C. The product was soft, flexible, moderately cloudy, and of moderate strength.

The above solid gel was thermoset by heating at 150° C. for 3 minutes with the application of 50 p.s.i. in the press. The thermoset product was hard, tough, clear, and light brown in color.

The present example was repeated with the exception that 1 part of t-butyl perbenzoate was used in place of the 0.30 part. Substantially the same results were obtained by forming the solid gel by a one minute exposure at 110° C. Cure under the conditions noted above produced a heat distortion temperature of 139° C. which is very close to the molding temperature of 150° C.

EXAMPLE II

Example I was repeated using the following mixture:

1,3-butylene glycol dimethacrylate _____ 40
t-Butyl perbenzoate _____ 0.40
Polyvinyl chloride homopolymer (average particle size 70 microns) _____ 30
Polyvinyl chloride homopolymer (particle size in the range of 0.05–30 microns) _____ 30

EXAMPLE III

A mixture was prepared containing the following parts by weight:

1,3-butylene glycol dimethacrylate _____ 30
t-Butyl perbenzoate _____ 0.30
Polyvinyl chloride homopolymer (average particle size 70 microns) _____ 28
Polyvinyl chloride homopolymer (particle size in the range of 0.05–30 microns) _____ 42

This mixture was of low viscosity and easily pourable at 23° C. It was placed in a vacuum (1 mm.) to remove entrapped air before use. A soft, flexible gel was prepared by impregnating a 6" x 6" piece of nonwoven binder-free glass fiber mat weighing 1.5 oz. with the above resin mixture. The impregnated mat contained 15% of glass fiber based on the weight of the impregnated mat. Gelation was obtained by heating 1 minute at 115° C. in a laboratory press at 50 p.s.i., followed by rapid cooling to 23° C. to produce a soft flexible solid sheet which was moderately cloudy and of moderate strength. The above sheet was cured by heating 3 minutes at 150° C. at 500 p.s.i. in the press. The product obtained was hard, tough, clear, light brown in color and the glass fibers were not prominently visible.

EXAMPLE IV

Example III was reproduced and the resulting gelled impregnated mat was cut up to form solid pieces measuring 1" x 1" and these were molded by dumping the same in a deep dish shaped mold just as though the pieces were molding powder. The mold was then closed and a temperature of 250° F. was applied under a pressure of 35 p.s.i. The mold remained closed for 4 minutes at which time it was opened and the finished dish-shaped piece ejected. It was not necessary to cool the mold in order to remove the hot molded piece without damage, and the various pieces of impregnated mat were not visually detectable in the final product. It was clear that both the resin and the glass fiber in the mat had flowed under the elevated temperature and pressure conditions imposed to fill the mold and shape the charge to the shape of the mold and to cause sufficient flowing together of the resin as to eliminate the individual identity of the 50 pieces that were used to charge the mold.

EXAMPLE V

The low viscosity mixture of Example III has blended into it 5% by weight of chopped glass fiber strand having an average length of 1/2" to form a viscous, but workable mixture which can be spread with a spatula. This mixture was molded in a press under a pressure of 180 p.s.i. for one minute at 115° C. followed by rapid cooling to 23°

C. The gel so-produced was moderately cloudy and moderately soft and flexible. This filled gel was cured at 500 p.s.i. at 150° C. for three minutes. A hard, tough, light brown solid was obtained constituted by clear resin having fibers dispersed therein. Both the resins and the fibers flowed during the molding operation.

EXAMPLE VI

Example V is repeated using 10% by weight of ¼" milled glass fibers. Comparable results are obtained.

The invention is not to be construed by any abstract of disclosure, but its features are instead characterized in the description given hereinbefore and is defined in the claims which follow.

I claim:

1. A stable room temperature-storable, essentially tack-free, flexible solid gel which can be shaped, flowed and cured to a tough, nonbrittle, rigid state by the application of pressure at a temperature in the range of 120–200° C., said solid gel consisting essentially of a solvated blend of (1) particles of high molecular weight essentially homopolymeric polyvinyl chloride containing in excess of 96% by weight of polymerized vinyl chloride, said polyvinyl chloride particles being a mixture of coarsely divided particles and finely divided particles in a weight ratio of from 1:3 to 2:1, said finely divided particles having an average particle size of from 0.05 to 30 microns and said coarsely divided particles having an average particle size in excess of 30 microns, and (2) reactive liquid plasticizer consisting essentially of a low molecular weight ester reaction product of alpha,beta-unsaturated monocarboxylic acid with an aliphatic polyhydric alcohol having a molecular weight below 600, in an amount up to about 35 percent by weight, based on the weight of the said blend, and in admixture with said blend, (3) free-radical generating polymerization catalyst, whereby the said gel can be cured to the aforesaid tough, rigid state by the application of pressure and heat.

2. A solid gel as recited in claim 1 having reinforcing fibers dispersed therein.

3. A solid gel as recited in claim 1 in the form of comminuted particles having a major dimension in the range of from ⅛" to 1".

4. A solid gel as recited in claim 1 in which said solid gel is in the form of a flexible fiber reinforced sheet.

5. A solid gel as recited in claim 4 in which said reinforcing fibers are constituted by a nonwoven mat of glass fibers.

6. A solid gel as recited in claim 1 in which said reactive plasticizer is present in an amount of at least about 20 parts of reactive plasticizer per 80 parts of polyvinyl chloride.

7. A method of producing a stable room temperature-storable solid gel comprising providing a fluid dispersion consisting essentially of particles of high molecular weight essentially homopolymeric polyvinyl chloride containing in excess of 96% by weight of polymerized vinyl chloride dispersed in reactive liquid plasticizer consisting essentially of a low molecular weight ester reaction product of alpha,beta-unsaturated monocarboxylic acid with an aliphatic poylhydric alcohol having a molecular weight below 600 and containing free radical generating polymerization catalyst, said polyvinyl chloride particles being a mixture of coarsely divided particles and finely divided particles in a weight ratio of from 1:3 to 2:1, said finely divided particles having an average particle size of from 0.05 to 30 microns and said coarsely divided particles having an average particle size in excess of 30 microns, heating said fluid dispersion to a temperature in the range of from about 90 to about 120° C. to at least partly solvate said polyvinyl chloride to gel said dispersion without significantly polymerizing said plasticizer, cooling said gelled dispersion before said plasticizer polymerizes significantly to form a stable room temperature-storable material which can be subsequently shaped and cured using pressure and temperatures in the range of 120–200° C.

8. A solid gel as recited in claim 7 in which said free radical generating polymerization catalyst is t-butyl perbenzoate.

9. A solid gel as recited in claim 1 in which said reactive plasticizer is 1,3-butylene glycol dimethacrylate.

10. A method of producing a stable room temperature-storable solid gel containing reinforcing fibers comprising combining with fibrous material a fluid dispersion consisting essentially of particles of high molecular weight essentially homopolymeric polyvinyl chloride containing in excess of 96% by weight of polymerized vinyl chloride dispersed in reactive liquid plasticizer consisting essentially of a low molecular weight ester reaction product of alpha,beta-unsaturated monocarboxylic acid with an aliphatic polyhydric alcohol having a molecular weight below 600 and containing free radical generating polymerization catalyst to provide an impregnated fibrous material, heating said impregnated fibrous material to a temperature in the range of from about 90 to about 120° C. to at least partly solvate said polyvinyl chloride and thus gel said dispersion without significantly polymerizing said plasticizer, and cooling said gelled dispersion before said plasticizer polymerizes significantly to form a stable room temperature-storable material which can be subsequently shaped and cured using pressure and temperatures in the range of 120–200° C.

11. A method of molding comprising charging a mold with a solid gel as recited in claim 1 and applying pressure while heating the material in said mold to a temperature in the range of 120–200° C. to cause said gel to flow and to cause said reactive plasticizer to polymerize to thermoset said gel, and discharging the molded piece which is formed at an elevated temperature with the dimensional stability of said piece being maintained by the thermoset condition of said gel.

12. A fluid, viscosity stable blend which can be cured at a temperature in the range of from 120–200° C. to form tough, coherent and nonbrittle products and consisting essentially of 60 to 80% by weight of a mixture of particles of high molecular weight essentially homopolymeric polyvinyl chloride containing in excess of 96% by weight of polymerized vinyl chloride dispersed in from 20 to 40% by weight of reactive liquid plasticizer consisting essentially of a low molecular weight ester reaction product of alpha,beta-unsaturated monocarboxylic acid with an aliphatic polyhydric alcohol having a molecular weight below 600 and containing free radical generating polymerization catalyst, said mixture of polyvinyl chloride particles being a mixture of coarsely divided particles and finely divided particles in a weight ratio of from 1:3 to 2:1, said finely divided particles having an average particle size of from 0.05 to 30 microns and said coarsely divided particles having an average particle size in excess of 30 microns.

13. A blend as recited in claim 12 in which said plasticizer is a polyester of a dihydric alcohol with an acid selected from the group consisting of acrylic acid, chloroacrylic acid, bromoacrylic acid, alkoxy acrylic acid, alkyl, aryl and acyl acrylic acid.

14. A blend as recited in claim 12 in which said plasticizer is 1,3-butylene glycol dimethacrylate.

15. A fibrous layer impregnated with the composition of claim 12.

16. A method of molding which comprises subjecting the fluid blend of claim 12 to pressure at a temperature in the range of 120–200° C.

17. A viscous spreadable blend of reinforcing fibers with the fluid blend recited in claim 12.

18. A method of molding which comprises subjecting the viscous spreadable fiber reinforced blend of claim 17 to pressure at a temperature in the range of 120–200° C.

19. A blend as recited in claim 12 in which said plasticizer is trimethylol propane trimethacrylate.

20. A stable room temperature-storable, essentially tack-free, flexible solid gel which can be shaped, flowed and cured to a tough, nonbrittle, rigid state by the application of pressure at a temperature in the range of 120–200° C., said solid gel consisting essentially of a solvated blend of (1) particles of high molecular weight essentially homopolymeric polyvinyl chloride containing in excess of 96% by weight of polymerized vinyl chloride, said polyvinyl chloride particles being a mixture of coarsely divided particles and finely divided particles in a weight ratio of from 1:3 to 2:1, said finely divided particles having an average particle size of from 0.05 to 30 microns and said coarsely divided particles having an average particle size in excess of 30 microns, (2) reactive liquid plasticizer consisting essentially of a low molecular weight ester reaction product of alpha,beta-unsaturated monocarboxylic acid with an aliphatic polyhydric alcohol having a molecular weight below 600, in an amount up to about 40 percent by weight, based on the weight of the said blend, and (3) free-radical generating polymerization catalyst; and (4) reinforcing fibers dispersed in said gel whereby the said gel can be cured to the aforesaid tough, rigid state by the application of pressure and heat.

21. A stable room temperature-storable, essentially tack-free, flexible solid gel which can be shaped, flowed and cured to a tough, nonbrittle, rigid state by the application of pressure at a temperature in the range of 120–200° C., said solid gel consisting essentially of a solvated blend of (1) particles of high molecular weight essentially homopolymeric polyvinyl chloride containing in excess of 96% by weight of polymerized vinyl chloride, said polyvinyl chloride particles being a mixture of coarsely divided particles and finely divided particles in a weight ratio of from 1:3 to 2:1, said finely divided particles having an average particle size of from 0.05 to 30 microns and said coarsely divided particles having an average particle size in excess of 30 microns, and (2) reactive liquid plasticizer consisting essentially of a low molecular weight ester reaction product of alpha,beta-unsaturated monocarboxylic acid with an aliphatic polyhydric alcohol having a molecular weight below 600, in an amount up to about 40 percent by weight, based on the weight of the said blend, and in admixture with said blend, (3) free-radical generating polymerization catalyst, whereby the said gel can be cured to the aforesaid tough, rigid state by the application of pressure and heat.

References Cited

UNITED STATES PATENTS

| | | | |
|---|---|---|---|
| 2,600,122 | 6/1952 | Meyer et al. | 260—884X |
| 3,074,905 | 1/1963 | Douglas | 260—884X |
| 3,133,825 | 5/1964 | Rubens | 260—884X |
| 3,157,713 | 11/1964 | Leese | 260—884 |
| 3,247,289 | 4/1966 | Sears | 260—884 |
| 3,401,138 | 9/1968 | Brady | 260—884X |
| 3,349,046 | 10/1967 | Abell et al. | 260—2.5 |

SAMUEL H. BLECH, Primary Examiner

R. J. SEIBERT, Assistant Examiner

U.S. Cl. X.R.

260—884, 899

PO-1050
(5/69)

UNITED STATES PATENT OFFICE
CERTIFICATE OF CORRECTION

Patent No. 3,557,046        Dated January 19, 1971

Inventor(s) Irving E. Muskat

It is certified that error appears in the above-identified patent and that said Letters Patent are hereby corrected as shown below:

Column 2, after line 10, one line is omitted as follows --elevated temperature. However, such polyvinyl chloride--. Column 4, line 41, "appropriate" should be --appropriated--. Column 8, line 69, "heated" should be --healed--. Column 11, line 63, "poylhydric" should be --polyhydric--.

Signed and sealed this 20th day of April 1971.

(SEAL)
Attest:

EDWARD M. FLETCHER, JR.        WILLIAM E. SCHUYLER, JR.
Attesting Officer               Commissioner of Patents